United States Patent
Weatherford et al.

(10) Patent No.: US 9,066,019 B2
(45) Date of Patent: *Jun. 23, 2015

(54) CAMERA PREVIEW VIA VIDEO TAG

(71) Applicant: Facebook, Inc., Menlo Park, CA (US)

(72) Inventors: Daniel Reed Weatherford, Emerald Hills, CA (US); Robert Douglas Arnold, San Francisco, CA (US); David Harry Garcia, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/525,526

(22) Filed: Oct. 28, 2014

(65) Prior Publication Data

US 2015/0042842 A1 Feb. 12, 2015

Related U.S. Application Data

(63) Continuation of application No. 13/655,845, filed on Oct. 19, 2012, now Pat. No. 8,902,325.

(51) Int. Cl.
| | |
|---|---|
| *H04N 3/14* | (2006.01) |
| *H04N 5/235* | (2006.01) |
| *H04N 5/341* | (2011.01) |
| *G06F 3/048* | (2013.01) |
| *H04N 5/232* | (2006.01) |

(52) U.S. Cl.
CPC ........... *H04N 5/23293* (2013.01); *H04N 5/341* (2013.01); *H04N 5/232* (2013.01); *H04N 5/23216* (2013.01)

(58) Field of Classification Search
CPC ..... H04N 5/341; H04N 5/345; H04N 5/3452; H04N 5/3454; H04N 5/3456; H04N 5/347; H04N 5/2628; H04N 5/23216

USPC ................... 348/207.1, 207.11, 211.3, 211.8; 715/238, 240, 760, 800, 861
See application file for complete search history.

(56) References Cited

U.S. PATENT DOCUMENTS

| | | | | |
|---|---|---|---|---|
| 5,978,020 | A * | 11/1999 | Watanabe et al. | 348/207.99 |
| 7,057,658 | B1 * | 6/2006 | Shioji et al. | 348/333.12 |
| 7,274,389 | B1 * | 9/2007 | Hieda | 348/207.1 |
| 7,788,596 | B2 * | 8/2010 | Iwabuchi | 715/800 |
| 8,134,605 | B2 * | 3/2012 | Hata | 348/211.3 |
| 8,294,805 | B2 * | 10/2012 | Kita | 348/333.02 |
| 2002/0126142 | A1 * | 9/2002 | Hodgkinson | 345/719 |
| 2003/0133024 | A1 * | 7/2003 | Ohnishi | 348/231.99 |
| 2004/0102976 | A1 * | 5/2004 | Pochueva | 704/270.1 |
| 2004/0169759 | A1 * | 9/2004 | Kikuchi | 348/333.12 |
| 2005/0128165 | A1 * | 6/2005 | Estrop et al. | 345/20 |
| 2005/0157948 | A1 * | 7/2005 | Lee | 382/299 |
| 2006/0221198 | A1 * | 10/2006 | Fry et al. | 348/222.1 |
| 2006/0250506 | A1 * | 11/2006 | Lee et al. | 348/222.1 |
| 2007/0030374 | A1 * | 2/2007 | Ishii | 348/333.01 |
| 2009/0034951 | A1 * | 2/2009 | Kawasaki | 396/57 |
| 2010/0287497 | A1 * | 11/2010 | Kano et al. | 715/800 |
| 2011/0037865 | A1 * | 2/2011 | Takagi et al. | 348/211.9 |
| 2013/0176444 | A1 * | 7/2013 | Masuda et al. | 348/207.11 |
| 2013/0187933 | A1 * | 7/2013 | Qin et al. | 345/501 |

\* cited by examiner

*Primary Examiner* — John Villecco
(74) *Attorney, Agent, or Firm* — Baker Botts L.L.P.

(57) ABSTRACT

In one embodiment, a computing device incorporating a camera receives an instruction associated with the camera to display an image generated by the camera in an area within a graphical user interface of an application running on the computing device. The computing device determines a width and a height of the area. The computing device instructs the camera to configure the image, in connection with its generation, for display in the area. And the computing device displays in the area the image as generated and configured by the camera.

20 Claims, 3 Drawing Sheets

CAMERA PREVIEW VIA VIDEO TAG

PRIORITY

This application is a continuation under 35 U.S.C. §120 of U.S. patent application Ser. No. 13/655,845, filed 19 Oct. 2012.

TECHNICAL FIELD

This disclosure generally relates to mobile computing devices.

BACKGROUND

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a camera-preview video may be directly injected into a Hypertext Markup Language (HTML) video tag. Instead of having software re-size or post-scale the camera-preview video based on a size specified by the video tag, particular embodiments directly instruct the camera to reconfigure its output size in hardware to match the size specified by the video tag.

DESCRIPTION OF EXAMPLE EMBODIMENTS

Figure 1:
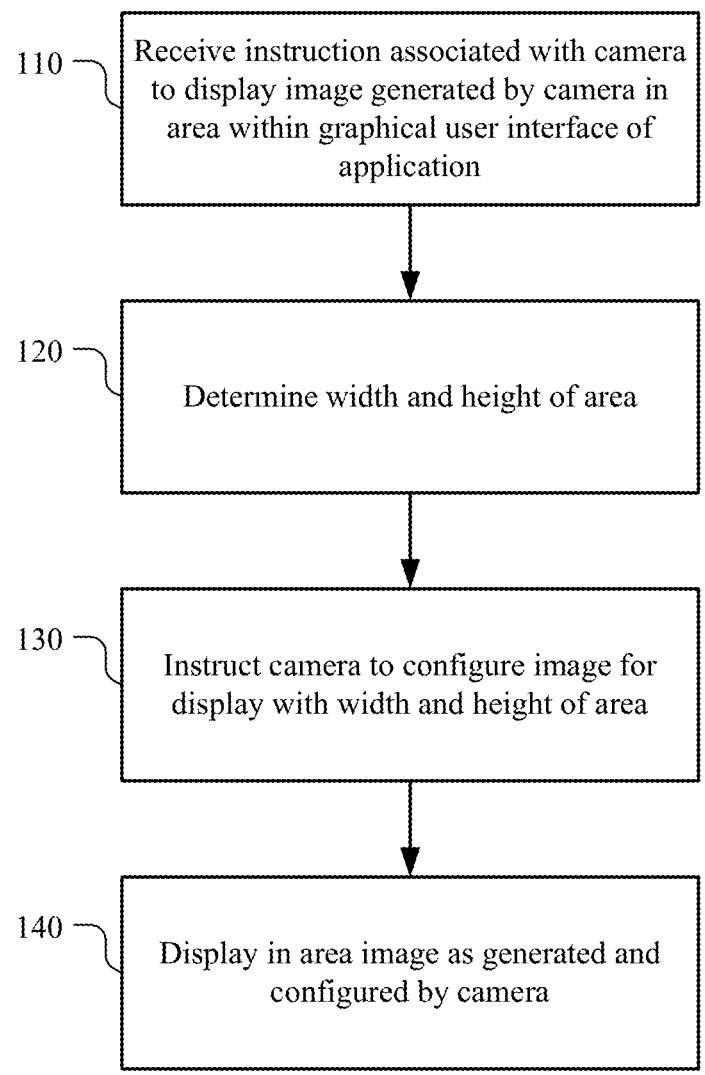
FIG. 1 illustrates an example method for displaying a camera preview window.

A structured document such as a web page may include, for example, page layout information, scripts, page content such as text, media data (e.g., graphics, photos, video clips), and executable code objects (e.g., a game executable within a browser window or frame). Structured documents may be implemented with languages and technologies such as Hypertext Markup Language (HTML), Extensible Markup Language (XML), Extensible Hypertext Markup Language (XHTML), JavaScript, WebGL, Cascading Style Sheet (CSS) including CSS animations and transitions, and, frequently, Java. A structured document may itself include references to multiple structured documents and contents. For example, a web page may include one or more inline references by incorporating Uniform Resource Locations (URLs) and/or script code (e.g., JavaScript, PHP, AJAX) that in response to a user event (e.g., a mouse click, a mouse hover-over), causes an application displaying the web page in a graphical user interface to dynamically retrieve content specified by an URL and the script code.

A layout engine (or web browser engine) is a software component or library for rendering structured documents in a graphical user interface. For example, Google's Chrome web browser and Apple's Safari web browser use WebKit software to render web pages. WebKit includes a layout engine WebCore and a JavaScript engine JavaScriptCore (for interpreting and executes JavaScript code). An application hosted by a computing device may utilize a layout engine to render structured documents by incorporating modules in the layout engine via an application programming interface (API) to the layout engine. A rendering process of an application incorporating a layout engine may access a structured document (e.g., a web page), and divide the structured document into one or more layers—e.g., based on HTML <div> or <iframe> tags. The rendering process may parse each layer into a render object data structure. For example, the rendering process may parse a layer of a structured document into a render object tree or a tree of nodes in Document Object Model (DOM) representation, wherein each node of a tree of nodes may comprise text, an image object, other DOM object, or a pointer or root of another tree of nodes. The rendering process may generate a raster image (i.e., a bitmap image) for each layer based on the render object tree and composite or combine raster images of the one or more layers into a single image to be displayed in a graphical user interface.

A structured document may include an image (e.g., a photo, a video) by using an HTML iframe tag. The image may have an intrinsic resolution in width and height (e.g., 1080 pixels in width and 810 pixels in height) as generated by its source such as a camera. On the other hand, the structured document may specify a different size in width and height for displaying the image (e.g., by specifying with <iframe width="560" height="420" src="[example source]"></iframe>), causing a rendering process to scale or re-size the image to match the size specified by the iframe tag while rendering the structured document. That is, the rendering process of the structured document may re-size or post-scale the image after the image is generated by its source. Here, re-sizing an image denotes changing a height or a width of the image. Here, scaling an image denotes changing a height and a width of the image while keeping the image's aspect ratio constant. Particular embodiments describe methods for re-sizing or scaling an image in a structured document as the image is generated. For example, particular embodiments may display in a user interface a video stream generated by a camera as a camera preview window (i.e., a camera viewfinder). Particular embodiments may determine a width and a height of the camera preview window, and instruct the camera to configure its output in the video stream to match the width and height of the camera preview window.

FIG. 1 illustrates an example method 100 for displaying a camera preview window. The example method 100 may be implemented by a computing device. For example, the example method 100 may be implemented by a process of an application (or an operating system) executing on one or more processors of the computing device. The computing device may be a desktop computer, a laptop computer, a tablet computer, a smartphone, or any suitable computing device. In particular embodiments, the computing device may comprise a camera. The example method 100 may begin at step 110. In particular embodiments, at step 110, the computing device may receive an instruction associated with the camera to display an image in an area within a graphical user interface of an application executing on the computing device. In particular embodiments, the image may be a photo or a video generated by the camera.

Figure 2A:
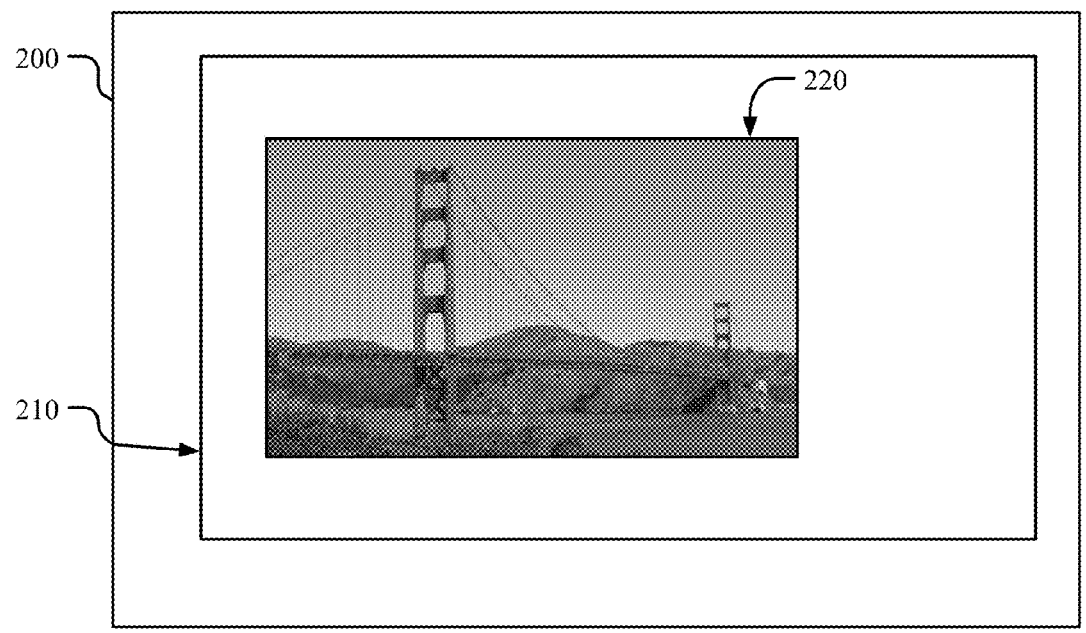
FIGS. 2A and 2B illustrate an example camera preview window.

For example, the computing device may display in its display an application's graphical user interface including an area that displays an image generated by the camera. The computing device (e.g., a process of the application) may instruct the camera to display the image in the area via an API or a device driver of the camera. In particular embodiments, the image may be a real-time video generated by the camera. That is, the area may correspond to a camera preview window for the camera of the computing device. In particular embodiments, the area for displaying a real-time video generated by the camera may comprise an HTML video tag (e.g., included in a structured document corresponding to the graphical user interface), while a source of the video tag may point to the camera of the computing device. That is, the computing device may inject the real-time video generated by the camera into the video tag. FIG. 2A illustrates an example camera preview window. In the example of FIG. 2A, a computing device may display in its touch display 200 a graphical user interface 210 of an application executing on the computing device. The graphical user interface 210 may include a camera preview window 220 that displays a real-time video generated by the camera of the computing device.

In particular embodiments, at step 120, the computing device may determine a width and a height of the area. For example, the computing device may determine a width and a height of the area as the width and height attributes specified by the HTML video tag. For example, the width and height attributes may be specified in the HTML video tag as <video width="320" height="240" src="[camera source]"></video>. The width and height of the area may be specified by the application or an operating system of the computing device. The width and height of the area may also be specified by a user of the computing device. For example, a user may perform one or more pinch-in or pinch-out touch gestures on the camera preview window 220 illustrated in FIG. 2A to change the size of the camera preview window 220.

In particular embodiments, at step 130, the computing device may instruct the camera to configure the image, in connection with its generation, for display in the area (with the width and height of the area in connection). The computing device may instruct the camera to re-scale or re-size its outputted image to match the width and height of the area (e.g., as specified by an HTML video tag). In particular embodiments, at step 140, the computing device may display in the area the image as generated and configured by the camera. For example, the computing device may, via an API or a device driver of the camera, instruct the camera to configure the real-time video output with a same resolution as the width and height of the area, and display the real-time video generated and configured by the camera in the area. That is, the computing device may configure the camera to generate a real-time video at the required width and height natively (i.e., by the camera hardware), instead of re-sizing or post-scaling the real-time video with software (e.g., by using a layout engine rendering the graphical user interface). Generating the real-time video at the required width and height natively may have a better speed performance (vs. re-sizing or post-scaling with software) as it is implemented with a dedicated hardware and thus may provide better user experience (e.g., smoother and more lively video). Generating the real-time video at the required width and height natively may also have a lower power consumption (vs. re-sizing or post-scaling with software) as it is implemented with a dedicated hardware.

In addition, in particular embodiments, the computing device may display in the graphical user interface one or more camera control elements. The computing device may display in the graphical user interface one or more elements controlling any suitable functions of the camera. For example and without limitation, the computing device may display in the graphical user interface one or more elements for controlling photo capture, video recording, color or monochrome mode selection, exposure time adjustment, focal-length adjustment, white-balancing, aperture size adjustment, light sensitivity adjustment (ISO or International Organization for Standardization speed), or auto-focusing mode selection of the camera.

Figure 2B:
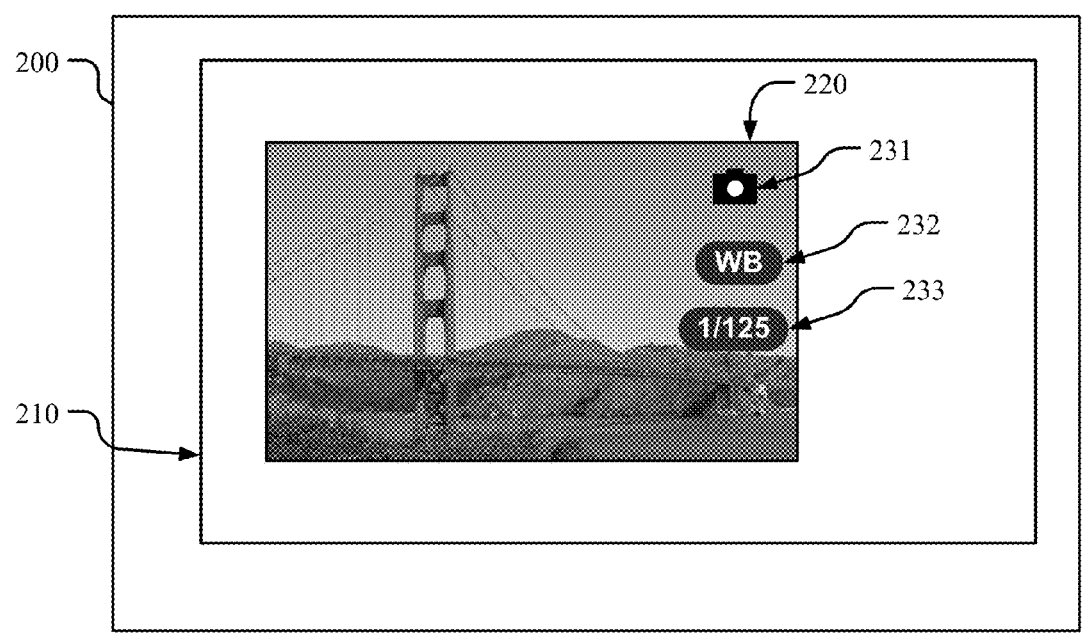

FIG. 2B illustrates example camera controller elements displayed in the camera preview window illustrated in FIG. 2A. As in the example of FIG. 2A, the computing device may display (in touch display 200) the graphical user interface 210 of an application. The graphical user interface 210 may include the camera preview window 220 that displays a real-time video generated by the camera of the computing device. The computer device may also display a photo capture control element 231, a white balance adjustment control element 232, and a scrollable exposure time control element 233 within the camera preview window 220. In particular embodiments, the camera control elements may be implemented as JavaScript event. A program running on the computing device may detect and process such events (e.g., a photo is captured, the camera is set at auto-focusing mode, and so on) by subscribing as listeners to those events.

In the example of FIG. 2B, a user of the computing device may control functions of the camera by performing touch gestures on touch display 200. That is, the user can interact with those control elements displayed in the graphical user interface to control detailed camera functions. For example, the user may perform a tap touch gesture on the control element 231. In response to the tap touch gesture, the application may instruct the camera (e.g., via an API or a device driver of the camera) to capture a photo. For example, the user may perform a tap touch gesture on the control element 232. In response to the tap touch gesture, the application may instruct the camera to turn on (or off) white-balancing function of the camera. For example, the user may perform a swipe touch gesture on the scrollable control element 232 to select a desirable exposure time (e.g., ⅟₆₀). In response to the swipe touch gesture, the application may instruct the camera to adjust to the desirable exposure time.

In particular embodiments, as the image or the camera controller elements may be represented as HTML DOM elements, the computing device (e.g., a rendering process for the graphical user interface) may create animation (e.g., by using CSS) for one or more of the content elements in the graphical user interface. For example, a user may perform a slide touch gesture on touch display 200 illustrated in FIG. 2B to move the control element 231 from the right side of the camera preview window 220 to the left side of the camera preview window 220. A rendering process for the graphical user interface 210 may create raster images of DOM elements of the graphical user interface (e.g., a DOM element for the area 220, a DOM element for control element 231, a DOM element for control element 232, a DOM element for control element 233, and so on). The rendering process may composite the raster images into a sequence of images, creating an animation effect of the control element 231 following the user's slide touch gesture from the right side to the left side of the camera preview window 220.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1.

Figure 3:
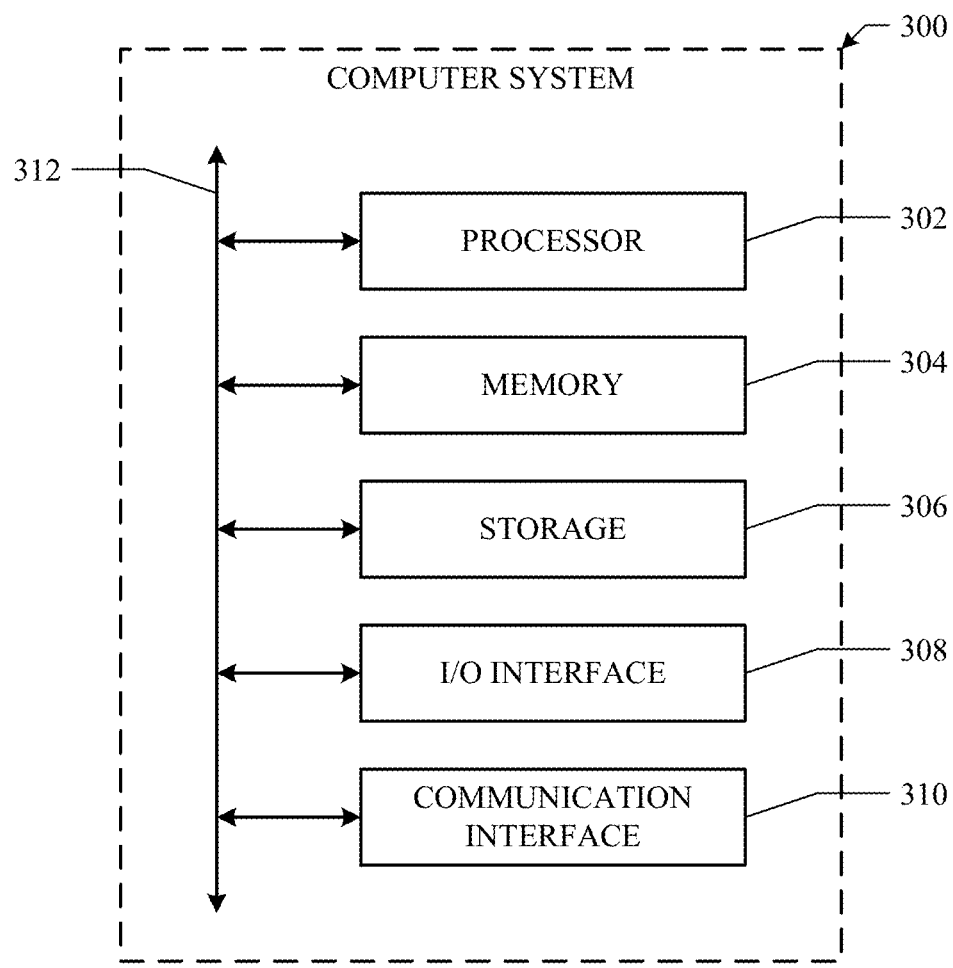
FIG. 3 illustrates an example computer system.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a mobile device comprising a camera, determining a width and a height of an area within a graphical user interface for displaying an image, wherein the image is to be captured by the camera;
   by the mobile device, instructing a device driver for the camera to configure the camera to capture the image in accordance with the width and height of the area; and
   by the mobile device, displaying in the area the image as captured by the camera.

2. The method of claim 1, further comprising displaying in the graphical user interface the image to be captured by the camera.

3. The method of claim 1, further comprising displaying in the graphical user interface a structured document comprising a Hypertext Markup Language (HTML) video tag, wherein the area is specified at least in part by the HTML video tag.

4. The method of claim 1, wherein the image is a real-time video.

5. The method of claim 1, further comprising displaying in the graphical user interface one or more camera control elements.

6. The method of claim 5, wherein the camera control elements are implemented as JavaScript events.

7. The method of claim 2, wherein the area is specified at least in part by one or more gestures by a user of the mobile computing device, wherein the gestures are associated with a portion of the graphical user interface displaying the image to be captured by the camera.

8. The method of claim 7, wherein one or more of the gestures comprise one or more pinch-in or pinch-out gestures.

9. One or more computer-readable non-transitory storage media embodying software that is operable when executed by a mobile device comprising a camera to:
   determine a width and a height of an area within a graphical user interface for displaying the image, wherein the image is to be captured by the camera;
   instruct a device driver for the camera to configure the camera to capture the image in accordance with the width and height of the area; and
   display in the area the image as captured by the camera.

10. The media of claim 9, wherein the software is further operable when executed to display in the graphical user interface the image to be captured by the camera.

11. The media of claim 9, wherein the software is further operable when executed to display in the graphical user interface a structured document comprising a Hypertext Markup Language (HTML) video tag, wherein the area is specified at least in part by the HTML video tag.

12. The media of claim 9, wherein the image is a real-time video.

13. The media of claim 9, wherein the software is further operable when executed by the mobile device to display in the graphical user interface one or more camera control elements.

14. The media of claim 13, wherein the camera control elements are implemented as JavaScript events.

15. The media of claim 10, wherein the area is specified at least in part by one or more gestures by a user of the mobile computing device, wherein the gestures are associated with a portion of the graphical user interface displaying the image to be captured by the camera.

16. The media of claim 15, wherein one or more of the gestures comprise one or more pinch-in or pinch-out gestures.

17. A mobile device comprising:
   one or more processors;
   a camera coupled to the processors; and
   a memory coupled to the processors comprising instructions executable by the processors, the processors being operable when executing the instructions to:
      determine a width and a height of an area within a graphical user interface for displaying the image, wherein the image is to be captured by the camera;
      instruct a device driver for the camera to configure the camera to capture the image in accordance with the width and height of the area; and
      display in the area the image as captured by the camera.

18. The mobile computing device of claim 17, wherein the processors are further operable when executing the instructions to display in the graphical user interface the image to be captured by the camera.

19. The mobile device of claim 17, wherein the area is specified at least in part by one or more of:
   a Hypertext Markup Language (HTML) video tag; or
   a user of the mobile computing device.

20. The mobile device of claim 17, wherein the image is a real-time video.

* * * * *